US005615359A

United States Patent [19]

Yung

[11] Patent Number: 5,615,359
[45] Date of Patent: Mar. 25, 1997

[54] DATA SERVER WITH DATA PROBES EMPLOYING PREDICATE TESTS IN RULE STATEMENTS

[75] Inventor: Alex Yung, Walnut, Calif.

[73] Assignee: Candle Distributed Solutions, Inc., Santa Monica, Calif.

[21] Appl. No.: 264,403

[22] Filed: Jun. 23, 1994

[51] Int. Cl.$^6$ .................................................. G06F 17/30
[52] U.S. Cl. .......................... 395/610; 395/50; 395/66; 395/200.03; 364/DIG. 1; 364/DIG. 2
[58] Field of Search ..................... 395/600, 10, 11, 395/12, 54, 200.03, 200.11, 200.12, 66, 50; 364/489, 401

[56] References Cited

U.S. PATENT DOCUMENTS

| | | | |
|---|---|---|---|
| 5,109,486 | 4/1992 | Seymour | 395/600 |
| 5,129,081 | 7/1992 | Kobayashi et al. | 395/600 |
| 5,307,484 | 3/1991 | Baker et al. | 395/600 |
| 5,446,885 | 5/1992 | Moore et al. | 395/600 |

FOREIGN PATENT DOCUMENTS

| | | |
|---|---|---|
| 0259224 | 3/1988 | European Pat. Off. . |
| 2232763 | 9/1990 | Japan . |

OTHER PUBLICATIONS

"Using Stored Procedures and Triggers", by Herb Edelstein, DBMS, v5, n10, p. 66(5) Sep. 1992.

*IBM Technical Disclosure Bulletin*, "Method to Centralize Maintenance Activity of a Performance Database," vol. 35, No. 2, Jul. 1992, pp. 364–368.

Snodgrass, Richard, *ACM Transactions on Computer Systems*, vol. 6, No. 2, "A Relational Approach to Monitoring Complex Systems," May 2, 1988, New York, NY, pp. 157–196.

*Primary Examiner*—Thomas G. Black
*Assistant Examiner*—Hosain T. Alam
*Attorney, Agent, or Firm*—Merchant, Gould, Smith, Edell, Welter & Schmidt

[57] ABSTRACT

A data server data base system is enhanced by the inclusion of Event processing in which the occurrence of an event based on a predicate test is determined by the data server without requiring attention of the user application. In particular, the user application stores a rule statement in the data server and then references that statement by name in a data inquiry. An event level data probe is invoked to collect the data referenced in the rule statement and the collected data is tested in accordance with the rule statement to determine if the event has occurred. Data passing the rule statement test is returned to the user application if the event is determined to have occurred unless Delta processing is invoked in which case only data representing a transition from Event true to Event false or Event false to Event true is returned.

8 Claims, 3 Drawing Sheets

Figure 2

| S# | CPU_UTIL | CPU |
|----|----------|-----|
| 1  | 88%      | P1  |
| 2  | 91%      | P1  |
| 3  | 93%      | P1  |
| 4  | 96%      | P1  |
| 5  | 94%      | P1  |
| 6  | 93%      | P1  |
| 7  | 92%      | P1  |
| 8  | 96%      | P1  |
| 9  | 88%      | P1  |
| 10 | 97%      | P1  |

Figure 3

| RuleName | Predicate       | Time  | Page_Rate |
|----------|-----------------|-------|-----------|
| CPU_BUSY | CPU_UTIL > 95%  | 03:04 | 12        |
| CPU_BUSY | CPU_UTIL > 95%  | 03:08 | 16        |
| CPU_BUSY | CPU_UTIL > 95%  | 03:10 | 8         |

Figure 4

| S# | CPU_UTIL | CPU |
|----|----------|-----|
| 1  | 88%      | P1  |
| 2  | 91%      | P1  |
| 3  | 93%      | P1  |
| 4  | 96%      | P1  |
| 5  | 94%      | P1  |
| 6  | 93%      | P1  |
| 7  | 92%      | P1  |
| 8  | 96%      | P1  |
| 9  | 88%      | P1  |
| 10 | 97%      | P1  |

Figure 5

| RuleName | Predicate       | Time  | Page_Rate |
|----------|-----------------|-------|-----------|
| CPU_BUSY | CPU_UTIL > 95%  | 03:04 | 12        |
| CPU_BUSY | CPU_UTIL > 95%  | 03:05 | 11        |
| CPU_BUSY | CPU_UTIL > 95%  | 03:08 | 16        |
| CPU_BUSY | CPU_UTIL > 95%  | 03:09 | 13        |
| CPU_BUSY | CPU_UTIL > 95%  | 03:10 | 8         |

| RuleName | Predicate |
|---|---|
| CPU_BUSY | CPU_UTIL > 95% |
| PAGE_BUSY | PAGE_RATE > 50 |
| HIGH_CPU | AVG(CPU_UTIL) > 90% |
| HIGH_PAGING | AVG(PAGE_RATE) > 30 |
| HIGH_IO | AVG(IO_COUNT) > 5000 |
| BAD_RESPONSE_TIME | HIGH_CPU or HI_PAGING or HI_IO |
| OVERLOAD | CPU_BUSY and PAGE_BUSY |

Figure 6

DATA SERVER WITH DATA PROBES EMPLOYING PREDICATE TESTS IN RULE STATEMENTS

BACKGROUND OF THE INVENTION

1. Field of the Invention

This invention relates in general to data processing techniques for monitoring the performance of computer software and systems, and in particular to relational data base techniques, such as SQL engines and data servers, for collecting, monitoring and comparing performance data from computers in a network.

2. Description of the Prior Art

In conventional computer performance monitoring applications, such as the OMEGAMON system from CANDLE CORPORATION of Santa Monica, Calif., the monitoring application generates a request for data, such as "How busy is the CPU?". This request is sent by the monitoring application to the subsystem having such information via the network transport system. The subsystem returns the information requested to the monitoring application which then processes the data as required. Monitoring data is often processed by predicate logic to compare the data against a predetermined threshold. Such comparisons are typically performed by rule based testing.

The systems to be monitored often include complex mainframe based computer networks. The information to be monitored continuously becomes more complicated so that there are enormous amounts of information to be analyzed. In order to reduce the amount of data to be reviewed by the system operators, some techniques have been developed to further filter the data before review by the operator, one example of which is the display by exception technique of the OMEGAVIEW system referenced above. In that application, once the data has been collected, the internal logic of the OMEGAVIEW system displays data to the human operator in accordance with a predicate logic test. The data that has been retrieved is compared to a predetermined predicate or threshold level and is displayed to the operator if and only if the data exceeds the predicate or threshold.

As the computer network systems to be monitored grow in size and complexity, the data to be monitored and tested grow the same way. What are needed are improvements in the structure of database systems and monitoring applications to reduce the substantial computational time, and other overhead requirements, of conventional monitoring applications.

SUMMARY OF THE INVENTION

In accordance with the present invention, a DataServer is located intermediate the data requesters and data sources and is utilized for data collection tasks by all data requesters, such as user applications, to reduce the redundant efforts and computational overhead associated with conventional data collection tasks. The collected data is stored in tables in the DataServer and transferred on a row by row basis as requested by the user applications. A conventional SQL is used to provide access to the data base using a standardized inquiry statement approach.

In addition to centralizing the data collection tasks, the DataServer further reduces application specific processing time requirements by localizing certain data processing tasks in the DataServer. These localized data processing tasks are related to the data being collected. In particular, the DataServer uses ruled based logic to provide a centralized, preliminary predicate logic evaluation of monitoring data being collected so that only data achieving the predetermined rule based predicate is passed onto the user application through the transport network. By operating on the collected data to transfer only data that has passed the predicate logic test, substantial user application data processing, and particularly network data traffic, is saved.

In a conventional DataServer configuration, an application requesting data where the data exceeded a predicate test threshold would be notified whenever a data sample was collected by the DataServer probe. The application would interrogate the DataServer in response to each such notification to determine if the data sample in fact indicated an occurrence of the event specified by the predicate test, that is, if the result of the predicate test by the DataServer indicated that the event had occurred. In a common interrogation of this kind, the application would determine the row count of a data table used to store sampled data which exceeded the predicate because a row count of zero would indicate that no data had passed the predicate test. This requires a one to one correlation between data sampling by the probe and DataServer interrogation by the application even though a substantial number of samples, and therefore of interrogations, would produce no usable data because the event had not occurred.

In accordance with the present invention, the event testing as well as the predicate testing is performed by the DataServer. A probe is launched to collect the data required by the predicate test. Thereafter a test to determine if the event has occurred is performed by the DataServer rather than the user application and if and only if the DataServer event test was positive, indicating that an event had occurred because the predicate test was positive, would the user application be notified so that the user application could collect the data. By having the DataServer generate a probe to collect the data for a predicate test and then testing the data sampling to determine the occurrence of the event, substantial interrogations by the user application that would have simply indicated that the event had not occurred may be saved.

Data processing in the DataServer is controlled by the individual user applications by means of an extension of the SQL data base technique. In particular, one or more user applications are provided with the ability to define predicate logic rules stored by name in a RuleBase Table in the DataServer. User applications have access to an Event() function included within an otherwise conventional SQL inquiry that controls the operation of the DataServer by requiring that collected data be processed in accordance with a selected rule in the RuleBase Table. If and only if the data achieves the predicate specified by the selected rule, then the row containing the relevant data is transferred back to the user application in response to the SQL inquiry, thereby substantially reducing the computational overhead required of the user application otherwise associated with data collection process.

In a further aspect, the present invention provides a method of operating a data base by applying a rule statement—providing a predicate logic test for specified data—to a data server from a user application, storing the rule statement by rule name in a rule table in the data server, applying an inquiry statement—referencing the rule statement by rule name—to the data server from the user application, recursively invoking an Event level data probe—in response to the data specified by the rule statement—to collect data from appropriate data source and to emit the data to the data server, testing the data returned by the Event level data probe in accordance with the predicate test, and invoking an Advisor level probe to return data passing the predicate test to the user application in response to the inquiry statement.

In addition, the method may further include storing a nested rule statement by rule name in the rule table, the nested rule statement referencing additional rule statement by rule name, and processing each nested rule statement to collect data specified by each rule statement referenced thereby.

In another aspect, the step of invoking of the Advisor level probe is enhanced by testing the data returned by the Event level data probe to determine if the data has changed state from passing to not passing the predicate test or from not passing to passing the predicate test, and inhibiting the return of data that has not changed state.

These and other features and advantages of this invention will become further apparent from the detailed description that follows which is accompanied by drawing figures. In the figures and description, reference numerals indicate various features of the invention, like numerals referring to like features throughout both the drawing figures and the description.

BRIEF DESCRIPTION OF THE DRAWINGS

FIG. 2 is a representation of some of the columns in DataTable 26 of FIG. 1.

FIG. 3 is a representation of additional columns in AdvisorTable 38 of FIG. 1.

FIG. 4 is a representation of some of the columns in DataTable 26 of FIG. 1 during Delta processing.

FIG. 5 is a representation of additional columns in AdvisorTable 38 of FIG. 1 during Delta processing.

FIG. 6 is a representation of a series of rules entered into RuleBase Table 34 of FIG. 1.

DETAILED DESCRIPTION OF THE PREFERRED EMBODIMENT(S)

Figure 1:
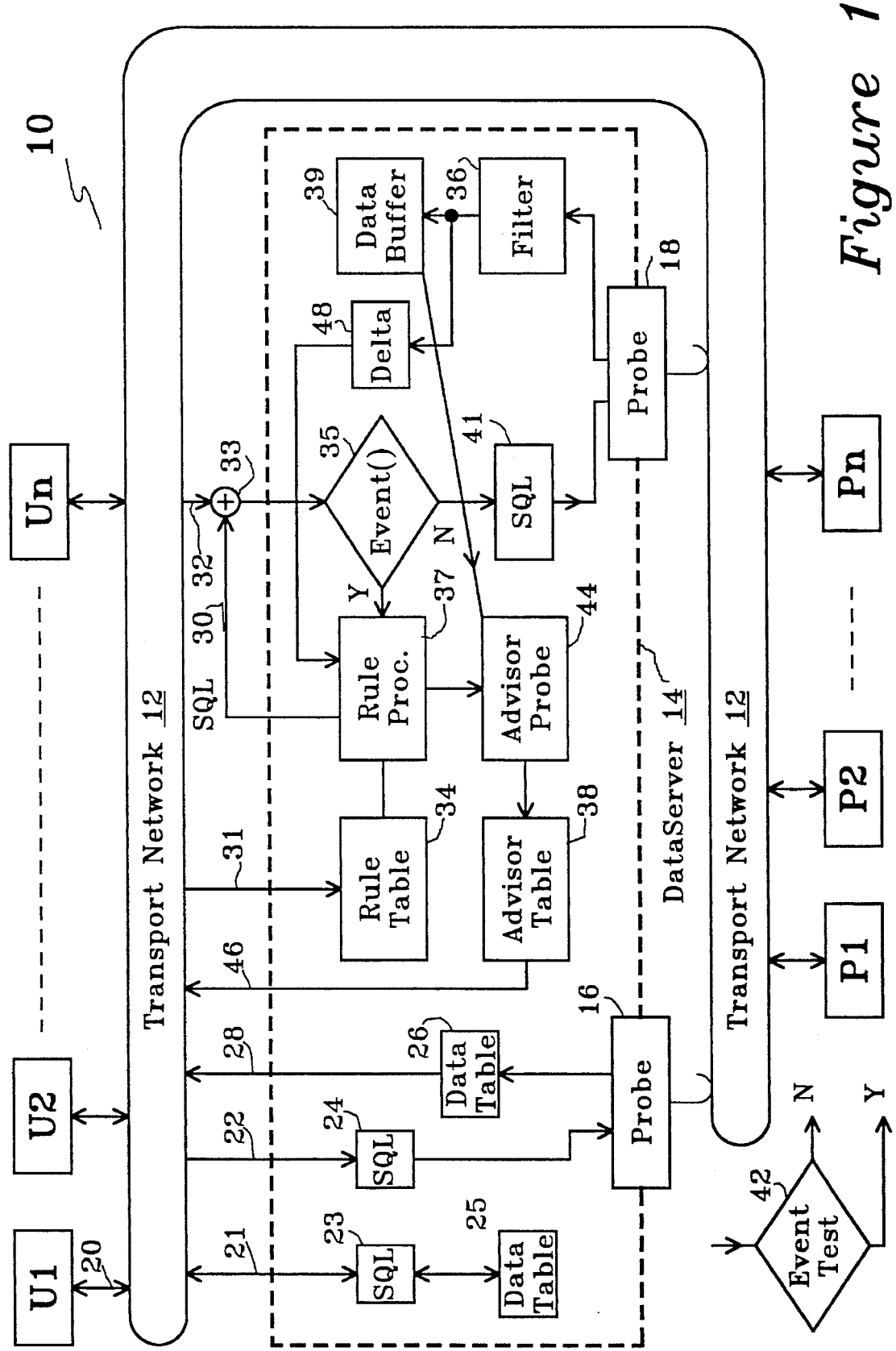
FIG. 1 is a function block diagram of a computer network monitoring system according to the present invention.

Referring now to FIG. 1, monitored computer network 10 includes a plurality of user applications U1 through Un which monitor networked platforms P1 through Pn via transport network 12. As described so far, computer network 10 is a conventional computer network in that the user applications may be located on any of the computer platforms and monitor any or all of the platforms because the platforms are networked, that is, tied together for communications by transport network 12.

FIG. 1 is a block diagram representation of a technique most conveniently implemented in software so it is intended to be an aid in understanding how this technique may be implemented rather than as a literal block diagram of hardware subsystems. A flow description of a preferred implementation of the technique is provided herein below.

In accordance with the present invention, computer network 10 further includes DataServer 14 which may be located on any of the platforms or on a specialized platform which is linked with networked platforms P1 through Pn by transport network 12. DataServer 14 may be considered to be linked with the platforms in three somewhat different manners as illustrated by the diagram in FIG. 1 by DataServerI/O path 21, DataServerInput and DataServerOutput paths 28 and 22, and by DataServerInput and DataServer-Output paths 32 and 46 which connect DataServer 14 to each user application via transport network 12. In addition, the later two linkages between DataServer 14 and the platforms includes data probes such as DataProbes 16 and 18 as will be described in greater detail below.

DataServer 14 serves as a data base holding data, such as data collected from platforms P1 through Pn, that are required for user applications U1 through Un. For convenience of description, a relational data base is described although persons of ordinary skill in this art could easily use other types of data bases. As a relational database, DataServer 14 is equipped with a data retrieval engine such as one using conventional system query language, or SQL statements. The SQL engine used in DataServer 14 includes enhancements to the conventional SQL statements as will be described below.

The operation of DataServer 14 via DataServerI/O path 21 as a conventional SQL database is described first, for convenience, followed by a description of DataServer 14 via DataServerInput path 22 and DataServerOutput path 28 as a conventional DataServer. Thereafter, the operation of DataServer 14 via DataServerInput path 32, AdvisorTable-Output path 46, and RuleTable input path 31 in accordance with the present invention will be described.

In the following descriptions, various DataServer paths will be individually described as single paths in order to provide a clearer explanation of the operation of computer network 10, particularly the data flow direction. All such paths may however be implemented using any of the various conventional techniques.

In some applications, DataServer 14 may be organized to operate as a conventional SQL database in which data is stored in DataServer 14 and retrieved therefrom by user application U1. This arrangement is described for clarity and completeness although not necessarily required for operation in accordance with the present invention. In this configuration, user application U1—or any other user application—may direct data via bi-directional communication path 20 to transport network 12 and therefrom via DataServerI/O path 21 to conventional SQL engine 23 for storage in DataTable 25. Thereafter, by submitting an appropriate inquiry or SQL statement, user application U1—or any other user application—may request the retrieval of such data. In response to the SQL statement, data will be returned from DataTable 25 under the control of conventional SQL engine 23 via DataServerI/O path 21, transport network 12 and bi-directional communication path 20.

In this manner, the operation of a conventional SQL engine is illustrated in which any data to be retrieved from a database must first be stored therein by the requesting user application—or another application—and then retrieved by the SQL from the database in response to the SQL statement.

A more complex operation is required for operation as a conventional DataServer in which the data to be returned is collected by the DataServer in response to the SQL statement. For example, user application U1 may apply an SQL statement to DataServer 14 which requires the return of data related to networked platform P1 which data has not yet been stored in DataServer 14. In response to a request for such data, a data probe is launched by DataServer 14 to collect the required data from networked platform P1 via transport network 12.

DataServer 14 includes a plurality of probes, two of which are represented by DataProbes 16 and 18, by which DataServer 14 collects data, such as performance data, from the platforms via transport network 12. Such probes are generally written so that the requesting application, such as user application U1, need not know the details of such data collection from the intended platform. That is, such probes may be prepared for use with the designated platforms, and maintained with DataServer 14, so that the information required to collect the data need not be redundantly maintained on many platforms nor updated for changes in many places.

In particular, user application U1 may provide an SQL statement via bi-directional communication path 20, transport network 12 and DataServerInput path 22 to DataServer SQL engine 24 requesting data which must be collected form transport network 12. DataProbe 16 is launched by DataServer 14 in response to the SQL statement applied to DataServer SQL engine 24. In accordance with the preprogrammed operation of DataProbe 16, the data will be collected from a local platform or, if necessary from a remote platform via transport network 12 and returned for storage in DataTable 26 by DataProbe 16. Once the data is available in DataTable 26, it may conveniently be returned to user application U1 via DataServerOutput path 28, transport network 12 and bi-directional communication path 20.

In accordance with the present invention, DataServer 14 is provided with enhanced abilities to permit data to be returned to a user application if and only if a predicate logic test applied to the data collected by the dataprobe is true, that is, only if the data has achieved the predetermined predicate logic threshold.

In the above example, user application U1 may effectively submit a data inquiry to DataServer 14 requesting CPU_UTIL data from networked platform P1 to be returned if and only if the CPU UTIL data exceeds 95%. Although the related dataprobe is required to collect CPU_UTIL data without regard for the value of the data, the CPU_UTIL data is returned to user application U1 only when that data exceeds 95%.

In accordance with the present invention, a substantial reduction of the use of system resources is achieved by an enhancement to the SQL engine by the addition of an EVENT() function to the SQL statement. Before the EVENT() function can be used, the events on which the predicate logic tests are to be based must be provided by the user application to DataServer 14. In a particular situation, if the only data pertinent to user application U1 regarding CPU usage occurs when the CPU usage exceeds a threshold or limit of 95%, the appropriate rule might be stated by defining a new term, CPU_BUSY, to represent CPU_UTIL greater than 95%.

Before use in an EVENT() function, the rule must be stored by user application U1 in RuleBase Table 34 in DataServer 14. The rule is transferred from user application U1 via bi-directional communication path 20, transport network 12 and RuleTable input path 31 for storage in RuleBase Table 34. Each such rule is stored, in the form of its name and its predicate, as columns in a row in RuleBase Table 34 via RuleTable input path 31. The above CPU utilization rule, which may simply be used for example to activate an alarm when CPU usage exceeds 95%, would be stored as the CPU_BUSY rule in the name and predicate column of RuleBase Table 34 as follows:

| NAME | PREDICATE | |
| --- | --- | --- |
| CPU_BUSY | CPU_UTIL > 95%. | (1) |

Thereafter, when an SQL statement is issued by user application U1 including an EVENT() function based on the CPU_BUSY rule, i.e. EVENT(CPU_BUSY), the data is returned to user application U1 if and only if the CPU_UTIL data exceeds 95%. The enhancement of the SQL engine function is depicted in FIG. 1 by the addition of event function and rule processing loops which operate in a recursive manner to probe DataServer 14 to determine when data meeting the predicate test is available for return to the requesting user application.

In particular, after the CPU_BUSY rule shown in statement (1) above has been stored in RuleBase Table 34, user application U1—or any other appropriate user application— may provide a data inquiry to DataServer 14 in the form of an SQL statement including an event function based on the stored rule. The SQL Event() statement is applied to DataServer 14 via bi-directional communication path 20, transport network 12 and DataServerInput path 32 and summer 33, the operation of one example of which will be described below in greater detail. Many other ways of implementing the same results are available to those skilled in these arts.

The SQL statement is applied to Event() processor 35 which determines if an Event() function is included. If an Event() function is included, the SQL statement is applied to RuleProcessor 37 which obtains the previously stored rule from RuleBase Table 34 to create recursive SQL statement 30 and to activate AdvisorProbe 44 as described in greater detail below. SQL statement 30 may be considered to be a recursive SQL statement in that it is created within DataServer 14 and used as a data inquiry applied to DataServer 14. The Event(CPU_BUSY) SQL statement applied to Event() processor 35 results in a recursive SQL statement 30 requesting the CPU_UTIL data as specified in the CPU_BUSY rule.

Recursive SQL statement 30 is then applied to DataServer 14 via summer 33. Recursive SQL statement 30 is shown in FIG. 1 as output from DataServer 14 for reapplication thereto through summer 33 to emphasize that recursive SQL statement 30 is functionally not distinguishable from any other SQL statement without an Event() function. In particular applications, it may well be more convenient to separate SQL statements differently and apply them more directly to the SQL engine. In any event, when processed by Event() processor 35, recursive SQL statement 30 is found to not include an Event() function and is therefore applied to DataServer SQL engine 41. Conventional SQL engine 23, DataServer SQL engine 24 and DataServer SQL engine 41 may all conveniently be implemented as a single SQL engine but are discussed separately herein to clarify the portions of the operation of DataServer 14 that may be performed with a conventional SQL engine implementation.

As shown above with regard to DataServer SQL engine 24 and DataProbe 16, DataServer SQL engine 41 launches DataProbe 18 which collects the CPU_UTIL data from networked platform P1 as requested and emits the collected data back to DataServer 14. The return data from DataProbe 16 is tested by predicate test processor, or filter, 36 to determine if the data has achieved its predicate, in this example, if the CPU_UTIL data exceeds 95%. If the CPU_UTIL data does exceed 95%, the data is stored in DataBuffer 39. Data from filter 36 is also provided via path 40 to Delta processor 48 if required and to rule processor 37.

Returning now to RuleProcessor 37, in addition to generating recursive SQL statement 30 by expanding the rule statement in the Event() function in accordance with the rule stored in RuleBase Table 34, RuleProcessor 37 causes the creation of an instance of AdvisorProbe 44 which is used to retrieve the return data stored in DataBuffer 39 for storage in AdvisorTable 38.

Whenever data is returned by DataProbe 18, RuleProcessor 37 attempts to retrieve a row of data from DataBuffer 39 by querying the rowcount in DataBuffer 39 to perform Event test 42. If the rowcount in DataBuffer 39 is zero, the return data has not been stored in DataBuffer 39 because the rule predicate was not achieved as determined by predicate test processor 36. In this configuration, the Event test used by DataServer 14 to determine if an event has occurred is a rowcount test.

In other words, using this particular type of event test, an event is deemed to have occurred only if data is stored in a table. Many other implementations of event testing are easily within the skill of the art. In fact, in many situations, the data is self testing in that data is only collected by the DataProbe if an event has occurred. Probes may be preprogrammed to perform the event testing before data is returned to DataServer 14 and/or the data may only exist if the event has occurred. Specialized probes, which may be considered to be event only probes, that only provide data if the predicate test has been passed that is if the event has occurred, inherently perform the function of predicate test processor 36 so that this filter may be eliminated from DataServer 14.

Returning now to the example in which a test for rowcount greater than zero is used as the event test, if the rowcount in DataBuffer 39 is not zero, the event has occurred and data achieving the predicate test has been returned and is retrieved from DataBuffer 39 by AdvisorProbe 44 for storage in AdvisorTable 38. The data in AdvisorTable 38 is returned to user application U1 from DataServer 14 via AdvisorTableOutput path 46, transport network 12 and bi-directional communication path 20.

It must be noted that data is returned from AdvisorTable 38 via AdvisorTableOutput path 46 in response to the occurrence of the event specified in the SQL Event statement. That is, the data is effectively sampled only when the predicate test specified by the rule is true even though the data is collected by the DataProbe at specified intervals. As far as requesting user application U1 is concerned, the data sampling occurs only when the CPU_UTIL data does in fact exceed 95%, thereby substantially reducing the computational overhead otherwise required in user application U1.

Referring now to FIGS. 2 and 3, a set of simple examples will be used to illustrate the operation of DataServer 14 in response to conventional SQL statements and in response to SQL statements including an EVENT() function. FIG. 2 is a representation of the contents of DataTable 26 as a function of time resulting from the application by user application U1 to DataServer 14 of the following simple inquiry statement designed to retrieve CPU_UTIL data from DataTable 26 where the CPU_UTIL data is greater than 95% on networked platform Pi:

```
SELECT    CPU_UTIL
FROM      DataTable 26
WHERE     CPU = P1 and CPU_UTIL > 95%.           (2)
```

Some of the columns of the resultant data samples collected are shown in FIG. 2 which illustrates 10 sets of samples, one in each row, of data for convenience. FIG. 2 is an example of the results of the operation of interval sampling in which the associated data probe is launched at fixed intervals. Assuming for convenience that the data collection interval for DataProbe 16 is one minute, the data in the first sample, or S#1, may have been collected at a time of 03:01 hours, the data in S#2 at 03:02 hours, etc. The processing overhead required for the data collection and processing shown in FIG. 2 is, on a relative scale, 10 units of computation. In a conventional data server arrangement the collection of each such sample would cause the user application to be notified. The application would then be required to determine if the event had occurred by for example testing to determine if rowcount was greater than zero. These ten samples would therefore also represent 10 units of network traffic each of which would include a notification of the user application, an interrogation by the user application, a reply to that interrogation as well as the request for transfer and transfer of data exceeded the predicate test.

If for a particular task the only CPU_UTIL data desired was CPU_UTIL data in the event that such CPU_UTIL data exceeded 95% as indicated by the "where" clause in the SQL statement, then the processing and network traffic for 7 out of 10 rows of CPU_UTIL data was unnecessary for this task. To reduce this unnecessary processing and traffic in accordance with the present invention, the CPU_BUSY rule specified in statement (1) above would be stored in RuleBase Table 34 and used to filter the data collected so that data was only collected and processed when CPU_UTIL was 95% or more. In particular, an extended SQL statement as shown below in statement (3) would be issued, as follows:

```
SELECT    CPU_UTIL, RuleName, Predicate,
          TimeStamp, PAGE_RATE
FROM      AvisorTable 38
WHERE     CPU = P1 and EVENT(CPU_BUSY)          (3)
```

Some of the columns of the resulting rows of data returned to user application U1 are shown in FIG. 3 which illustrates the 3 rows of data that would be processed during the same time interval during which the 10 rows of data shown in FIG. 2 were processed, i.e. from 03:01 through 03:10 hours. The columns of data shown in FIG. 2 are typically also provided in AdvisorTable 38 shown in FIG. 3, but these rows have not been repeated in FIG. 3 for ease of understanding. It is important to note that in accordance with the present invention, the samples related to the blank rows at times 1,2,3,5,6,7, and 9 do not result in notification to the user application and the resultant processing and network traffic.

In a conventional configuration, these samples would have caused unnecessary processing and traffic as the user application determined that they did not represent valid data or the occurrence of an event by for example testing to determine that the rowcount was not greater than zero. The rows shown in FIG. 3 are blank rows that would not in practice actually be present in AdvisorTable 38, but are shown herein to represent the processing overhead and network traffic saved in accordance with the present invention. The processing overhead and traffic actually required for the data collection and processing shown in FIG. 3 is, on the same relative scale used above with regard to FIG. 2, only 3 units of computation. Therefore, if for a particular task the only data CPU UTIL data desired was CPU_UTIL data in the event that the CPU_UTIL exceeded 95%, then the unnecessary processing of 7 out of 10 rows of CPU_UTIL data can be eliminated for this task by use of the EVENT() function and the CPU_BUSY rule.

It is important to note that the data transferred to user application U1 need not be the same data collected by DataProbe 18 in response to a particular rule, such as the CPU_BUSY rule. In the statement example described above in statement (3), additional data such as TimeStamp and PAGE_RATE were collected by DataProbe 18 when the CPU_UTIL data exceeded its predicate, even though such additional data was not specified in the CPU_BUSY rule. This provides a substantial advantage because the only time the additional data is collected is when needed in accordance with the active rule. Alternatively, the data specified by the rule need not be entered into AdvisorTable 38 for transfer to user application U1. For example, in a particular task only the time of occurrence of the CPU_UTIL achieving 95% or more may be important. In that situation, the SQL statement and resultant columns transferred from AdvisorTable 38 to user application U1 would be limited to RuleName, Predicate and TimeStamp. In particular implementations of the present invention, the various user applications may require additional data, referred to herein as meta data, in order to process the data received from AdvisorTable 38. Such meta data may well include such information as data type and data length. All such meta data is made available to the user application by inclusion in columns in AdvisorTable 38.

Referring now to FIG. 6, a representation of a series of rules entered into RuleBase Table 34 is shown to illustrate some of the flexibility available with rules. In particular, the rules may be nested, that is, one rule may refer back to and incorporate one or more other rules which may also refer back to one or more other rules.

As shown in FIG. 6, the CPU_BUSY rule represents the predicate CPU_UTIL greater than 95%, as specified above in statement (1), and the PAGE_BUSY rule represents the predicate PAGE_RATE greater than 50. The HIGH_CPU, HIGH_PAGING and HIGH_IO rules represent the predicates of the average CPU_UTIL greater than 90%, average PAGE_RATE greater than 30 and average IO_COUNT greater than 5000. The BAD_RESPONSE_TIME rule predicate is the combination of either the HIGH_CPU, HIGH_PAGING or HI_IO predicates. That is, the event BAD_RESPONSE_TIME is said to occur if one of the following other events occur: HIGH_CPU, HIGH_PAGING or HI_IO. Similarly, the OVERLOAD rule has reached its predicate if both the CPU_BUSY and PAGE_BUSY events occur.

The ability to store and nest rules in RuleBase Table 34 shown in FIG. 1 provides great flexibility in a network environment such as computer network 10. In particular, the same rules may well be used for several different user applications as well as be nested within other rules. By storing such rules once in RuleBase Table 34 it is not necessary to prepare these rules separately for each such application. The rules can therefore clearly be reused as necessary.

The operational flow of the following implementation of an event driven sampling system in accordance with the present invention may conveniently be considered in three separate stages: event definition, event instantiation and event termination. Each such stage requires operations to be performed by both user application U1 as well as by DataServer 14, as described below:

EVENT DEFINITION

1. User Application U1 Accepts Event definition from User.

Before a rule can be entered into RuleBase Table 34, the rule must be defined in a manner usable by DataServer 14. The first step is for the User in control of user application U1 to define, within user application U1, an Event in terms acceptable to the User.

2. User application U1 Store Event definition in Situation database.

It is convenient for user application U1 to maintain a database, not shown, storing the various defined Events because such Event definitions are reusable to recall the corresponding RuleName for the resultant rule stored in RuleBase Table 34.

3. User application U1 converts Event definition to DataServer Rule SQL by translating definition tokens into Table and Column names.

Once the Event definition is stored in the user application U1 Situation database, the data representations —or tokens—used in user application U1 must be translated by user application U1 into terms usable as part of a DataServer 14 SQL statement, namely the names of the items of data needed are used as column headings of the various tables, such as DataTable 26 and AdvisorTable 38, in which such columns will be located.

4. User application U1 transfers Rule to DataServer 14 using DataServer INSERT SQL statement.

After the translation into standard SQL statement terms has been accomplished, the rule is transferred by user application U1 to transport network 12 via bidirectional communication path 20.

5. DataServer 14 performs a normal insert of the Rule into RuleBase Table 34.

DataServer 14 receives the INSERT SQL statement from transport network 12 via RuleTable input path 31 and inserts, that is stores, the rule in RuleBase Table 34.

EVENT INSTANTIATION

6. User application U1 receives/accepts indication from User that Event is to be monitored.

The user in control of user application U1 must not only store the rule in RuleBase Table 34 but indicate to user application U1 that the monitoring for a particular event is to be started. Events are indicated to be monitored at the discretion of the User and not all Events will be so indicated and those Events indicated to be monitored will not necessarily all be actually monitored at the same time.

7. User application U1 issues CreateRequest call to DataServer in an Advisor SQL statement including the EVENT() function key word specifying the rule to be applied to the SQL statement and the columns of data to be returned when the rule predicate is achieved.

After the User has indicated that a particular Event will be monitored, the user application U1 must identify the data to be returned by listing the columns of data to be retrieved upon detecting an occurrence of the event.

8. DataServer 14 instantiates a primary collection mechanism for the data in Advisor SQL issued by user application U1.

Once the Advisor SQL including the EVENT() function naming a particular rule has been received by DataServer 14, DataServer 14 must make arrangements for the collection and storage of the data specified in the Advisor SQL by the creation of AdvisorProbe 44.

9. DataServer 14 instantiates a secondary collection mechanism for the data specified in the rule named in the Event() function.

The data specified by the rule in the EVENT() function must be collected by a DataProbe, such as DataProbe 18 of FIG. 1, which is invoked in response to an SQL statement such as recursive SQL statement 30, issued by DataServer 14 to retrieve the data. If the recursive SQL statement also includes an EVENT() function, it is further reprocessed until no further EVENT() function calls are present. Thus a nesting of collection processes is created in which the Advisor level waits until the Event() level has successfully completed. The Advisor thereby becomes both a DataServer probe and an Application (issuing recursive SQL statements) at the same time and therefore may be considered a MetaProbe.

10. User application U1 issues an Open call to the DataServer indicating that monitoring is to begin.

User application U1 conveys the Users decision to begin monitoring to DataServer 14.

11. User application U1 issues a wait for notification pending results of the event sampling.

After the SQL statement indicating that the monitoring is to begin has been communicated to DataServer 14, user application U1 then waits for the data to be returned and no further actions are required from user application U1.

12. DataServer 14 waits until the proper time interval, as specified by user application U1 in its CreateRequest, to collect data at the Event level.

Data sampling intervals are normally set by the requesting application. The Event level data collection is performed at the specified interval.

13. DataServer 14 invokes RuleProcessor 37 which issues recursive SQL statement 30 back to DataServer 14 to invoke the Event level data collection and analysis.

This step illustrates the recursive nature of the operation in that AdvisorProbe 44, when invoked in response to the SQL statement applied to DataServer 14, applies its own SQL to DataServer 14 to collect the data.

14. DataServer 14 invokes DataProbe 18 to perform data collection in accordance with recursive SQL statement 30.

The data emitted back to DataServer 14 in response to recursive SQL statement 30 is filtered in predicate test processor 36 in accordance with the "WHERE" clause therein. If any rows of data pass the filtering, or no filtering was specified, the condition is deemed to be true and the Event is deemed to have occurred.

15. When the Event is true, RuleProcessor 37 notifies AdvisorProbe 44 that there is Event data.

In the case of Delta Event processing as described below in greater detail, RuleProcessor 37 notifies AdvisorProbe 44 only if the Event condition has changed state, that is, only if the Event condition has gone from false to true or true to false.

16. AdvisorProbe 44 retrieves the raw data from DataBuffer 39 and emits data in AdvisorTable 38 that describes the Event.

If there are no rows of data in DataBuffer 39, i.e. the rowcount inquiry performed by Event test 42 indicates that the rowcount is not greater than 0, no Event is deemed to have occurred.

17. Once AdvisorProbe 44 has completed its data collection, DataServer 14 will send an asynchronous notification to user application U1 that the Event has data occurred and data, if any, is available on AdvisorTableOutput path 46.

18. User application U1 fetches the data rows from AdvisorTable 38 and/or notifies the User.

19. User application U1 issues a Close call to DataServer 14 indicating the end of this data collection cycle and reissues the Open call if appropriate to indicate readiness to be notified at the next occurrence of the Event.

EVENT TERMINATION

20. In response to the User, when appropriate, user application U1 issues a DestroyRequest call to indicate that the condition is no longer to be monitored.

21. In response to a DestroyRequest call from user application U1, DataServer 14 and AdvisorProbe 44 close any outstanding open requests and destroy related resources.

The exact sequence of the flow, and the various calls made, depend upon the nature of the data retrieval engine and DataServer implemented as well as the characteristics of the particular programming employed.

A further enhancement of the event driven sampling system described above is called Delta Processing in which AdvisorProbe 44 is only notified when the Event condition changes state rather than every time the condition is detected. That is, Delta Processing causes a notification and/or data to be returned to user application U1 when data collected by DataProbe 18 indicates that the WHERE clause of the Delta Event SQL statement has been achieved, but then does not return a further notification until the data collected by DataProbe 18 indicates that the WHERE clause has not been achieved. When an Event is either true or false twice in a row, Delta processor 48 suppresses notification to AdvisorProbe 44. Only the change from true to false or false to true will result in Advisor data collection and subsequent application notification.

An example of a Delta Event SQL statement similar to statement (3) above would be as follows:

| | | |
|---|---|---|
| SELECT | CPU_UTIL, RuleName, Predicate, TimeStamp, PAGE_RATE | |
| FROM | AvisorTable 38 | |
| WHERE | CPU = P1 and EVENT(DELTA(CPU_BUSY)). | (4) |

With regard then to FIG. 1, in response to a Delta Event SQL statement such as statement (4) shown above, when data is returned by DataProbe 18, the data is tested by filter 36 and the data notification returned to rule processor 37 via path 40 is further tested by Delta processor 48. Delta processor 48 suppressed the notification to rule processor 37 of repetitions of the same condition. That is, the only notification passed to rule processor 37 occurs when the Event condition changes state from true to false or false to true.

Referring now to FIGS. 4 and 5, FIG. 4 repeats the showing of FIG. 2 of the data stored in DataBuffer 39 in response to 10 instances of a one minute interval sampling by DataProbe 18. FIG. 5 represents some of the additional columns of data that would be stored in AdvisorTable 38 in response to the Delta function in statement (4) for comparison with the data that is shown in FIG. 3 to have been stored in response to an Event function statement.

In particular, row 4 is stored in RuleBase Table 34 because the Event changed state from false to true, that is, row 3 was false and row 4 was true. Similarly, row 5 is stored because the Event changed state again, this time from true to false. It should be noted that row 5 did not qualify for storage as a result of an Event function as shown for comparison in FIG. 3 because row 5 does not represent a true condition for the Event, only a change in state from the previous sampling interval.

Row 8 is the next row stored in AdvisorTable 38 because it is the next change of state, from false back to true. Similarly, rows 9 and 10 are both stored in AdvisorTable 38 because they represent changes in state for the Event condition, from true back to false and back to true again, respectively.

Although many other variations of suppression or other criterion may be applied as tests to the trueness of the Event condition, the Delta function may be the most important for convenient process monitoring. Similarly, although one or more specific embodiments have been disclosed, it is well within the skill of a person of ordinary skill in this art to utilize the present invention in various other embodiments. It must therefore be noted that the scope of the invention is defined by the claims hereafter appended.

What is claimed is:

1. A method of operating a data base, comprising the steps of:

applying a rule statement, including a predicate test for specified data, to a data server from a user application;

storing the rule statement by rule name in a rule table in the data server;

applying an inquiry statement, referencing the rule statement by rule name, to the data server from the user application;

invoking an Event level data probe from the data server, in response to the data specified by the rule statement, to collect data from an appropriate data source and to emit the collected data to the data server;

testing the collected data emitted by the Event level data probe at the data server in accordance with the predicate test;

determining the occurrence of an event represented by the predicate test; and invoking an Advisor level probe from the data server to return data passing the predicate test to the user application in response to the inquiry statement if and only if the event was determined to have occurred.

2. The invention of claim 1, further comprising the steps of:

storing a nested rule statement by rule name in the rule table, said nested rule statement referencing additional rule statements by the rule name; and processing each nested rule statement to collect data specified by each rule statement referenced thereby.

3. The invention of claim 1, wherein the step of invoking the Advisor level probe further comprises the steps of:

testing the data returned by the Event level data probe at the data server to determine if the data has changed state from passing to not passing the predicate test or from not passing to passing the predicate test; and inhibiting the return of data from the data server that has not changed state.

4. A method of operating a data base, comprising the steps of:

receiving a rule statement from a user application at a data server;

invoking a data probe from the data server, in response to the received rule statement, to collect data specified by the rule statement and to emit the data to the data server;

testing the collected data at the data server in accordance with the rule statement to determine whether a predicate test within the rule statement is satisfied by the collected data;

returning the collected data from the data server to the user application when the predicate test within the rule statement is satisfied by the collected data; and inhibiting the return of the collected data from the data server to the user application when the predicate test within the rule statement is not satisfied by the collected data.

5. The invention of claim 4, further comprising the steps of:

storing a nested rule statement by rule name in the rule table, said nested rule statement referencing additional rule statements by the rule name; and processing each nested rule statement to collect data specified by each rule statement referenced thereby.

6. The invention of claim 4, wherein the step of returning the collected data to the user application further comprising the steps of:

testing the data returned to the data server by the data probe to determine if the data has changed state from passing to not passing the predicate test or from not passing to passing the predicate test; and inhibiting the return of data that has not changed state.

7. The invention of claim 4, wherein the step of invoking a data probe further comprises the step of:

collecting data from a plurality of different platforms.

8. A method of operating a data base, comprising the steps of:

forming a rule statement in the form of a predicate test defining an event for a user application related to specified data in a data base;

invoking a data probe from the data server, in response to the rule statement, to collect the specified data by the rule statement and to emit the data to the data server;

testing the collected data at the data server in accordance with the rule statement to determine whether a predicate test in the rule statement is satisfied by the collected data;

returning the collected data from the data server to the user application if and only if the predicate test is satisfied by the collected data; and inhibiting the return of the collected data from the data server to the user application when the predicate test within the rule statement is not satisfied by the collected data.

* * * * *

UNITED STATES PATENT AND TRADEMARK OFFICE
CERTIFICATE OF CORRECTION

PATENT NO. : 5,615,359

DATED : March 25, 1997

INVENTOR(S) : Alex Yung

It is certified that error appears in the above-identified patent and that said Letters Patent is hereby corrected as shown below:

Column 5, line 31, "CPU UTIL" should read --CPU_UTIL--.

Column 8, line 61, "CPU UTIL" (both instances) should read --CPU_UTIL--.

Column 9, line 4, "PAGE RATE" should read --PAGE_RATE--;

line 4, "CPU UTIL" should read --CPU_UTIL--.

Column 12, line 40, "AvisorTable" should read --AdvisorTable--.

Column 8, line 32, "AvisorTable" should read -- AdvisorTable--.

Signed and Sealed this

Third Day of March, 1998

*Attest:*

BRUCE LEHMAN

*Attesting Officer*      *Commissioner of Patents and Trademarks*